United States Patent [19]
Robinson

[11] Patent Number: 5,052,752
[45] Date of Patent: Oct. 1, 1991

[54] INFINITELY ADJUSTABLE LINEAR SEAT RECLINER

[75] Inventor: David L. Robinson, Sterling Heights, Mich.

[73] Assignee: Fisher Dynamics Corporation, St. Clair Shores, Mich.

[21] Appl. No.: 542,210

[22] Filed: Jun. 21, 1990

[51] Int. Cl.$^5$ ............................................. B60N 1/02
[52] U.S. Cl. ................................. 297/361; 297/375
[58] Field of Search ............... 297/361, 375; 403/366

[56] References Cited

U.S. PATENT DOCUMENTS

| | | | |
|---|---|---|---|
| 3,369,841 | 2/1968 | Heyl, Jr. | 297/361 |
| 4,243,264 | 1/1981 | Bell | 297/375 X |
| 4,357,050 | 11/1982 | Fisher, III | 297/375 X |
| 4,759,587 | 7/1988 | Bucka | 297/361 |
| 4,799,734 | 1/1987 | Périou | 297/361 |
| 4,805,961 | 2/1989 | Garrod | 297/361 |
| 4,824,172 | 4/1989 | Rees | 297/361 |

*Primary Examiner*—Peter A. Aschenbrenner
*Attorney, Agent, or Firm*—Harness, Dickey & Pierce

[57] ABSTRACT

A seat recliner mechanism for controllably adjusting the angular position of a seat back relative to a seat member in response to actuation by a seat occupant is disclosed. The seat recliner mechanism includes a rod adapted to be operatively connected to one of the seat back and the seat member. The recliner mechanism is pivotally connected to the other of the seat back or the seat member and is configured to receive a portion of the rod for linear movement relative thereto. The mechanism includes a split nut assembly engaging the rod which is movable between a first position inhibiting linear movement of the rod and a second position permitting linear movement of the rod. A clamp assembly having a passage for encasing the split nut assembly is provided and which has at least one pivotable lock clamp member adapted to reduce the cross-section of the passage when pivoted in a first direction and to enlarge the cross-section when pivoted in a second direction. The clamp assembly includes an actuation device for pivoting the lock clamp member in the second direction to move the split nut assembly from the first position to the second position.

24 Claims, 6 Drawing Sheets

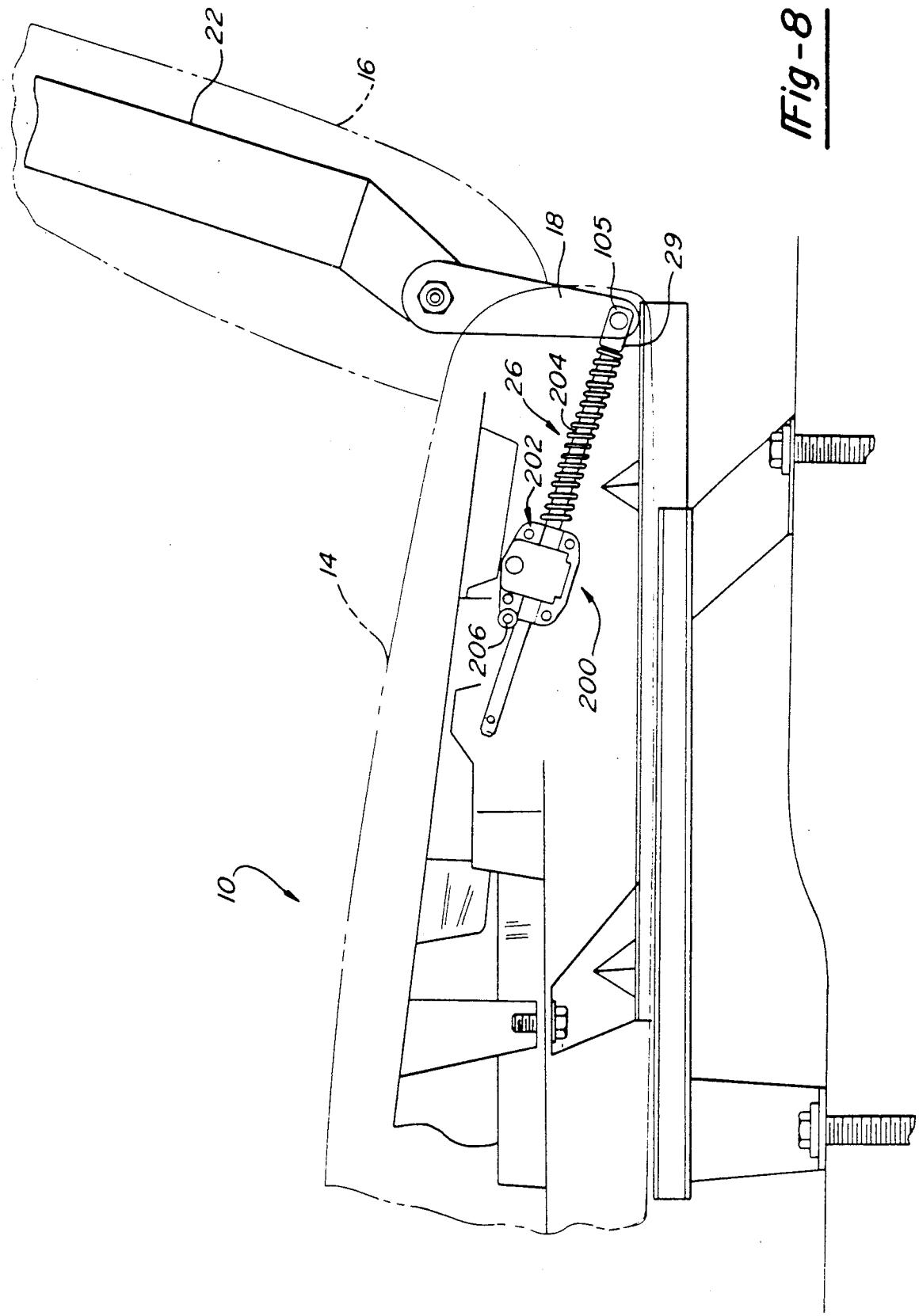

INFINITELY ADJUSTABLE LINEAR SEAT RECLINER

BACKGROUND AND SUMMARY OF THE INVENTION

The present invention relates to a seat recliner mechanism and, more particularly, to an infinitely adjustable linear seat recliner mechanism for positioning and retaining a reclinable seat back relative to a seat cushion in a desired angular position.

Commercial aircraft and motor vehicles are commonly equipped with adjustable seat assemblies which provide added comfort and convenience for the occupant. Typically, seat assemblies include a seat cushion that is affixed to a structural seat frame. The seat frame is mounted to the floor of the vehicle or aircraft and is usually of a rail-type design to allow forward and rearward ("fore and aft") adjustment of the seat cushion. A seat back member is typically coupled for pivotal movement relative to the seat cushion by one or more recliner support members. A seat recliner mechanism provides for angular positioning of the seat back relative to the seat cushion.

In general, recliner mechanisms can be categorized into two basic design categories. The first category typically relies on some type of frictional engagement locking mechanism to set the inclination of the seat back. The second category relies upon an incrementally engagable ("meshed") device. An advantage of frictional engaging recliner mechanisms is that the angular adjustment potential is infinitely variable.

Numerous incrementally engagable seat recliner mechanisms have been disclosed in the art for positioning and retaining the seat back in a fixed angular position relative to the seat cushion. For example, U.S. Pat. No. 4,372,610, issued to A.J. Fisher III, et al on Feb. 8, 1983, describes a recliner mechanism employing a pair of meshing straight-toothed racks. One of the racks is connected to an upper recliner structure through a toothed quadrant component. Adjustment of the reclined angular position of the seat back is accomplished by changing the meshed position of one rack with respect to the other. Such seat recliner mechanisms employ meshing teeth for position fixing which provides stepped finite incremental angular changes in the reclined position.

Likewise, various frictional engagement recliner devices are known in the art. U.S. Pat. Nos. 4,687,252 and 4,705,319, each assigned to the assignee of this application, relate to continuously variable recliner mechanisms employing a toothed sector on the upper recliner structure adapted to mesh with a recliner gear which, in turn, communicates with a rotating actuator clutch drum. A clutch spring is selectively tightened or loosened around the clutch drum to provide the infinitely variable seat back adjustment.

Although the afore-noted "prior art" devices perform satisfactorily, it is desirable to provide further improvements in the design and operation of seat recliner mechanisms. Therefore, it is desirable to provide an improved linear seat recliner mechanism adapted to provide continuously variable seat back angular positioning. In this manner the seat occupant is not constrained to a fixed angular position dictated by a incrementally adjustable recliner mechanism. Likewise, many currently known seat recliner mechanisms produce an annoying clatter or "ratcheting" sound during adjustment. It is therefore desirable to provide a linear seat recliner mechanism which provides silent operation and has smooth release characteristics. Another desirable characteristic for a seat recliner apparatus is the ability to prevent unrestrained pivoting motion of the seat back in the event of failure or improper operation of the seat recliner mechanism. Designers are further constantly striving for ease of production, low cost, simplicity, and reliability of the recliner hardware components.

Accordingly, it is a primary object of the present invention to overcome the disadvantages of the prior art and provide an improved linear seat recliner mechanism. In general, this is accomplished by providing an infinitely adjustable linear seat recliner mechanism and a method of utilization of the same. In a preferred embodiment of this invention, a threaded split nut assembly is adapted to spin on a linearly movable threaded recliner rod. The split nut assembly is encased within a clamp assembly. The clamp assembly has an interior wall surface defining a passage in which the split nut assembly is disposed such that an exterior surface of the split nut assembly engages the interior wall surface of the clamp assembly. The helix angle of the recliner rod is designed to make it fairly easy for the recliner rod to move relative to the rotatable nut assembly. A release lever is provided to pivotally move a release shaft associated with the clamp assembly. Release of the seat back, to allow angular adjustment thereof, is achieved by selectively loosening the clamp assembly whereby the split nut assembly rotates freely on the recliner rod. Therefore, the recliner rod is permitted to move linearly for generating corresponding pivotal adjustment of the seat back. To lock the seat back in a desired reclined position, the clamp assembly is selectively tightened to urge the split nut assembly into locking engagement with the threaded recliner rod thereby lockingly restraining movement of the threaded rod.

An advantage of the present invention is that it is ideally suited for reclining seat assemblies which also have mechanisms to allow the seat back to be pivoted forward allowing ingress to the rear seats in conventional two-door motor vehicles. Furthermore, the present invention is advantageous in that its design is compatible with many recliner seats presently in production. Additionally, the seat recliner mechanism is extremely light and can be placed in a very small space "envelope" under the seat.

Additional objects, benefits, and advantages of the present invention will become apparent to those skilled in the art to which this invention relates from the subsequent description of the preferred embodiments, and the appended claims, taken in conjunction with the accompanying drawings.

BRIEF DESCRIPTION OF THE DRAWINGS

FIG. 4 is an exploded perspective view of the split nut assembly and the assembly of the present invention;

FIG. 8 is a section view of a second preferred embodiment of the present invention.

DETAILED DESCRIPTION OF THE PREFERRED EMBODIMENTS

Figure 1:
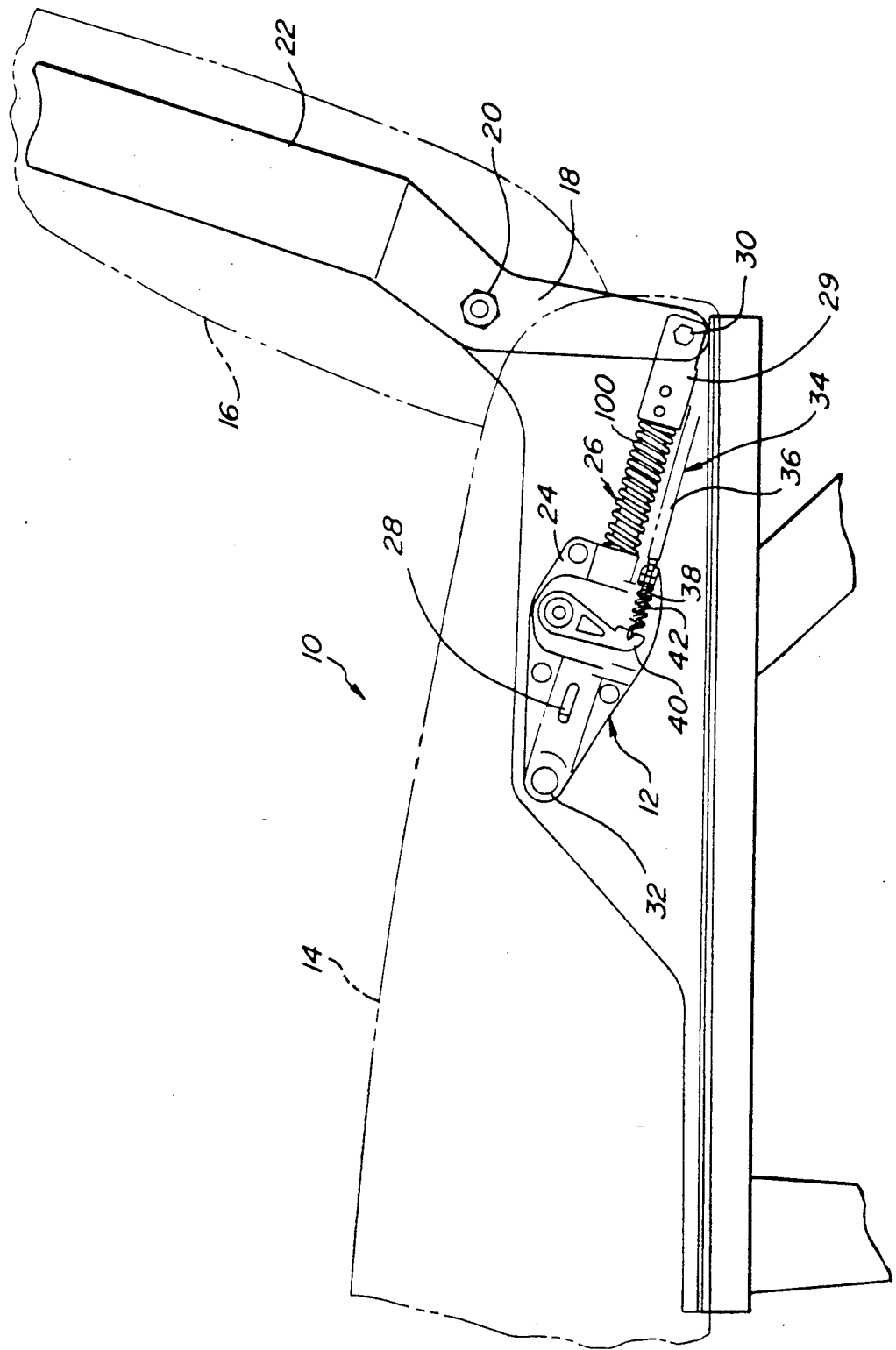
FIG. 1 is a section view of a seat assembly according to a first preferred embodiment of the present invention, illustrating the operational association between an infinitely adjustable linear seat recliner mechanism and a common seat structure.

Referring now to FIG. 1 of the drawings, a reclining seat assembly 10 incorporating an infinitely adjustable linear seat recliner mechanism 12 according to a first preferred embodiment of the present invention is shown. More specifically, FIG. 1 illustrates a seat assembly 10 preferably adapted for installation in an aircraft, such as a passenger carrying commercial airliner for providing a predetermined range of continuously variable angular movement between a seat cushion 14 and a seat back 16. Recliner mechanism 12 functionally interconnects seat cushion 14 and seat back 16 to permit the inclined angle therebetween to be controllably varied. Seat back 16 is coupled for pivotal movement relative to seat cushion 14 to a lower recliner structure 18, such as by fasteners 20, to permit seat back 16, supported on an upper recliner structure 22, to be pivoted to a desired reclined position. The upper and lower reclining structures, 18 and 22, respectively, are typically fabricated of a relatively rigid material and are suitably configured to provide stable pivotal motion upon actuation of recliner mechanism 12. However, it will be appreciated by those skilled in the art that the present invention encompasses an infinitely adjustable linear seat recliner mechanism which is adapted to be applicable to a variety of known seat assemblies and structures.

Figure 2:
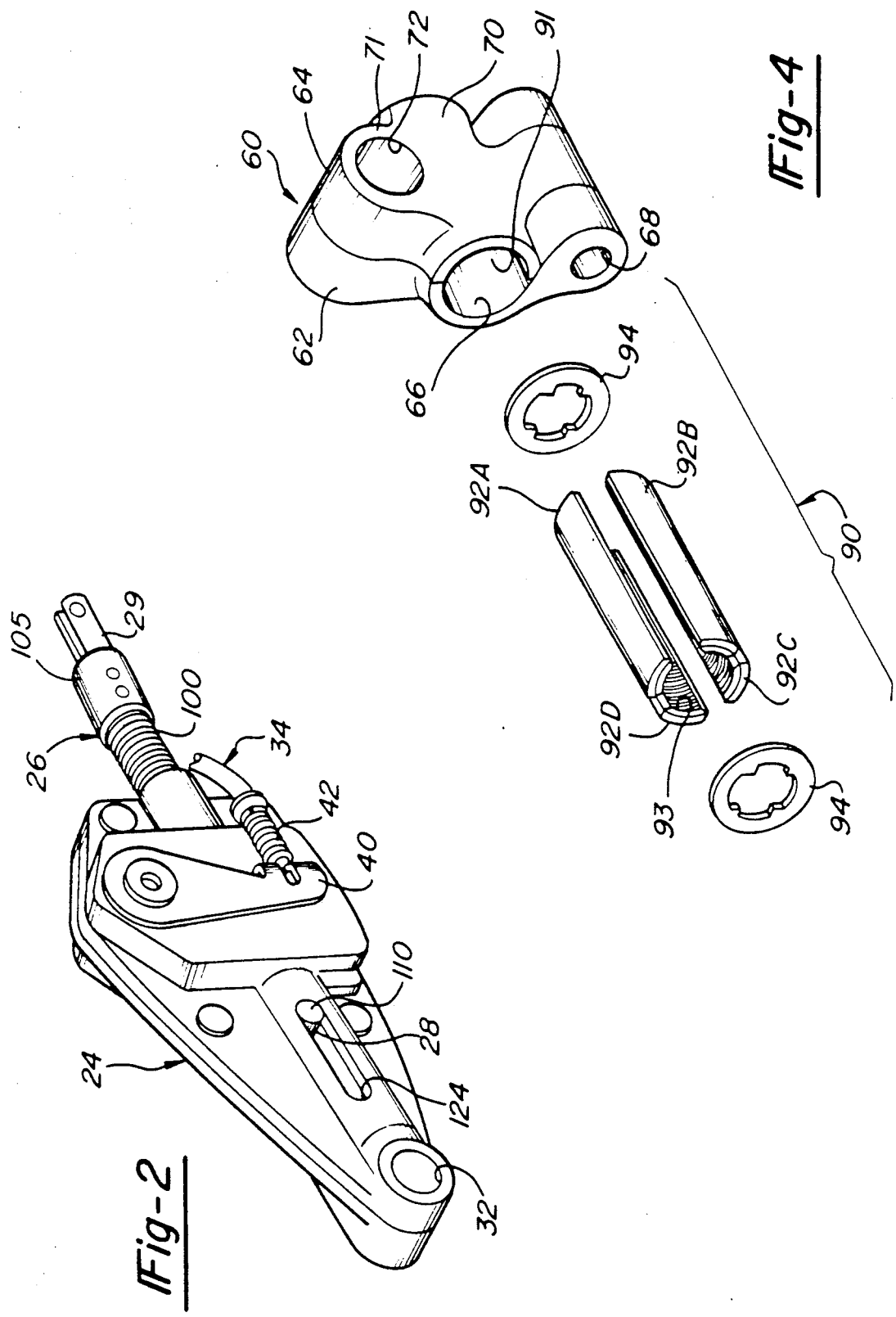
FIG. 2 is a pictorial view of the infinitely adjustable linear seat recliner mechanism according to the first preferred embodiment of the present invention.

With particular reference to FIGS. 1 and 2, recliner mechanism 12 preferably includes a housing assembly 24 provided for encasing the operative components of the present invention. Extending through one end portion of housing assembly 24 is a recliner rod assembly 26 including a threaded rod 100 having a first end 28 disposed within housing assembly 24 and a second end 29 adapted to be mounted to lower recliner structure 18 as by fasteners 30. In this manner, linear movement of recliner rod 100 relative to housing assembly 24, through a limited range of axial motion, defines a corresponding range of angular movements of seat back 16 relative to seat cushion 14. At the opposite end of housing assembly 24 is a transverse bore 32 adapted to mount recliner mechanism 12 to structural support components associated with seat assembly 10. Recliner 12 is permitted to pivot about bore 32 upon movement of threaded rod 100.

Recliner mechanism 12 is provided with release means for permitting recliner rod 100 to move linearly in a generally unrestrained manner and locking means for inhibiting recliner rod 100 from moving. In particular, the release means include a release cable 34 having an outer sheath 36 and an axially movable inner core 38 affixed to a pivotable release lever 40. Biasing means, such as illustrated by release spring 42 is adapted to maintain release lever 40 and inner core 38 in the first biased position illustrated in FIG. 1. Actuation of cable 34 (axial movement of inner core 38 in a direction opposing the biasing of spring 42) is provided by a remotely located release switch, button or handle (not shown) which is commonly provided in close proximity to seat assembly 10 to permit a seat occupant to selectively raise or lower seat back 16 relative to seat cushion 14. This is ergonomically advantageous since the release device can be remotely located from the recliner mechanism 12 to provide the seat occupant with ready access thereto. The operation and functional association of the means for locking and releasing associated with recliner mechanism 12 will be described hereinafter in greater detail.

Figure 3:
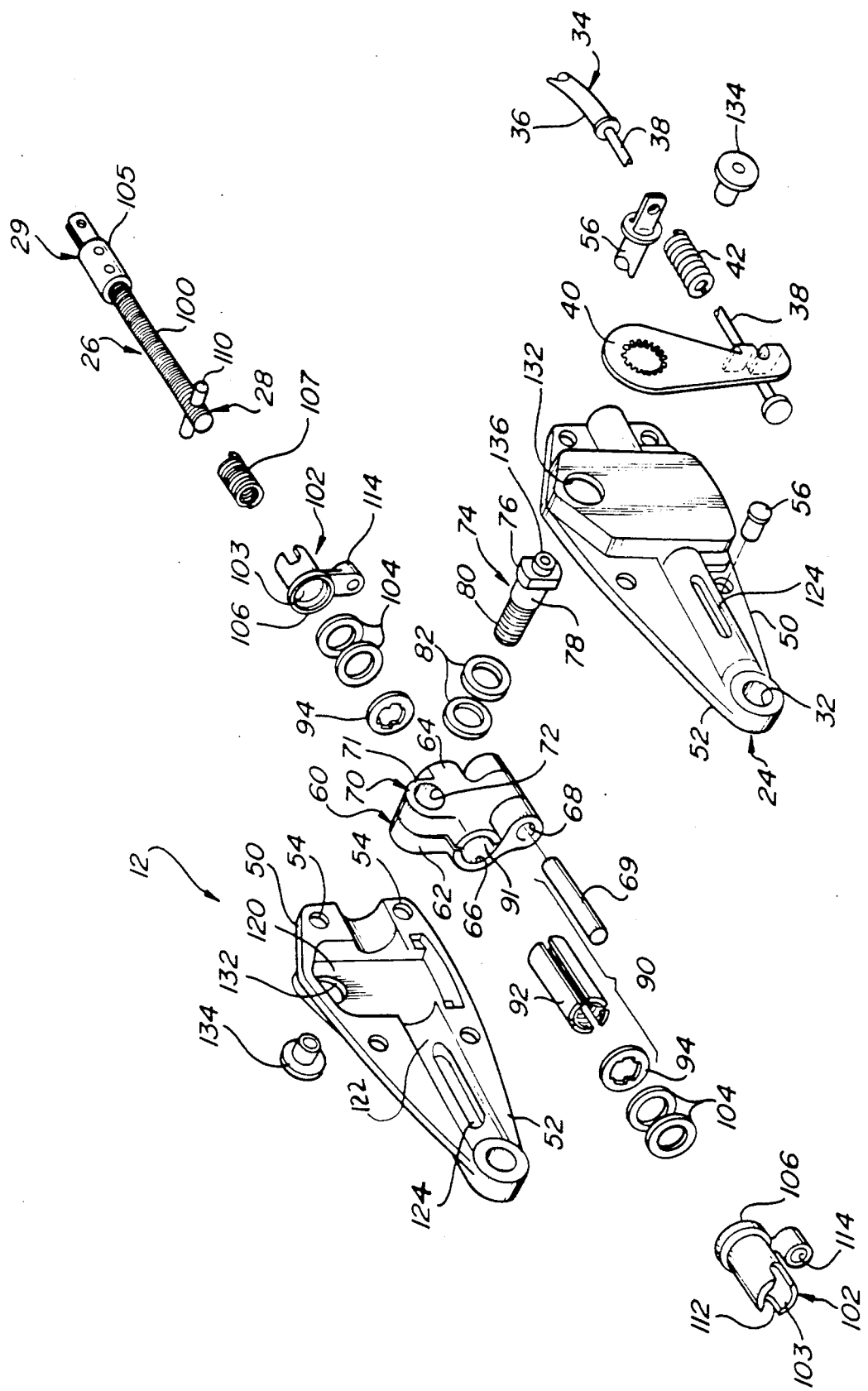
FIG. 3 is an exploded perspective view of the infinitely adjustable linear seat recliner shown in FIG. 2.

Referring now to FIGS. 3 and 4, the functional association of the components assembled in linear recliner mechanism 12 are illustrated. Recliner mechanism 12 includes housing assembly 24 having a first housing member 50 and a mirror-imaged second housing member 50' each having a generally planar mating surface 52. The housing members have a plurality of complementary apertures 54 adapted to receive rivets 56 to secure housing members 50 and 50' together to define housing assembly 24. Preferably, first and second housing members, 50 and 50', are fabricated from a rigid material, and more preferably, from a high composite plastic, zinc, aluminum or magnesium die-cast material. Bore 32 permits recliner mechanism 12 to be secured to a lateral support structure provided under seat assembly 10 in a semi-permanent fashion. In this manner, access for repair or replacement of recliner mechanism 12 is readily provided.

In general, the lock and release components of the present invention are operatively associated with clamp assembly 60 and split nut assembly 90. Clamp assembly 60 includes first and second locking clamp 62 and 64, respectively, each having first and second wall surfaces with the first wall surface being in abutted relationship so as to define an inner wall surface 66. Second locking clamp 64 is pivotally secured relative to first locking clamp 62 about its bottom portion such that a longitudinal aperture 68 sized to receive a dowel pin 69 defines a fulcrum point about which locking clamps 62 and 64 may be pivotably moved. The outer surface of second locking clamp 64 includes a boss 70 having a relatively planar surface 71 through which a non-threaded passage 72 extends generally transversely to dowel pin aperture 68. First locking clamp 62 has a complementary threaded aperture (not shown) axially aligned with non-threaded aperture 72. Release shaft 74 is adapted to be disposed within non-threaded aperture 72 and the threaded aperture of locking clamp 62 such that a shoulder 76 provided on release shaft 74 is positioned generally adjacent boss surface 71 on locking clamp 64. Release shaft 74 has a first non-threaded portion 78 adapted to be disposed in non-threaded passage 72 and a threaded portion 80 which is adapted for threaded engagement with the threaded passage on first locking clamp 62. Thrust washers 82 are provided between boss surface 71 and a rear surface of shoulder 76 to reduce the friction therebetween. When release shaft 74 is rotated in a first direction, at least one and preferably both locking clamps 62 and 64 pivot outwardly about the fulcrum point to generate a larger inner wall surface 66. Likewise, when release shaft 74 is rotated in a second direction, locking clamps 62 and 64 are preferably pivoted toward each other so as to "squeeze" them together to define a smaller inner wall surface 66.

Figure 6:
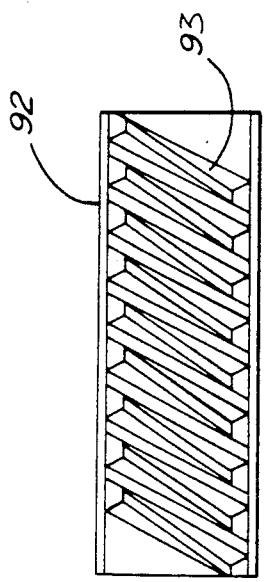
FIG. 6 illustrates a threaded surface portion of a split nut segment.

Split nut assembly 90 (see FIG. 4) is adapted to be disposed within an elongated longitudinal passage 91 defined by inner wall surface 66 of clamp assembly 60. As will be described hereinafter in greater detail, elongated passage 91 is configured to generally define oppositely extending frusto-conical tapered surfaces. Split nut assembly 90 is, in general, a lock nut which has been divided into a plurality of segments. Preferably, split nut assembly 90 has an elongated configuration defined by four nut segments 92A through 92D. The inner surface of each split nut segment is provided with a threaded surface 93 which is adapted to threadably engage rod 100 to spin (rotate) thereon (see FIG. 6). The helix angle of the threads of rod 100 and split nut segments 92 are relatively large such that a force exerted on rod 100 will cause rod 100 to move linearly unless otherwise restrained.

Figure 5:
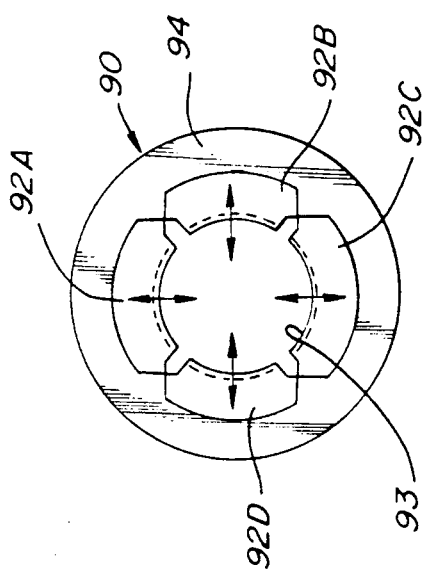
FIG. 5 is an end view of the split nut assembly.

At opposite ends of nut segments 92A-92D, disc-like retainers 94 are provided which are slid over the opposite terminal ends of the split nut segments. As illustrated in FIG. 5, the primary purpose of retainers 94 is to maintain the angular position of each nut segment 92A-92D relative to each other, as well as to limit the outward radial motion of nut segments 92 as they rotate as an assembly on the threads of recliner rod 100. Retainers 94 are configured to maintain each split nut segment in a orientation so as to permit inward ("collapsed") and outward ("expanded") radial movement relative to rod 100. In general, when nut segments 92A-92D are "collapsed" inwardly relative to threaded rod 100 of recliner rod assembly 26, split nut assembly 90 acts to inhibit non-rotational rectilinear movement of the rod so as to define a locked position. Likewise, when the nut segments are permitted to "expand" outwardly on the threads of recliner rod assembly 26, split nut assembly 90 is free to rotate thereby allowing threaded rod 100 to linearly move to define a released state. Nut segments 92A-92D are preferably fabricated of a powdered metal, bearing grade steel which is oil impregnated to be generally self-lubricating. Application of separate nut segments significantly reduces the cost of nut assembly 90 compared to a monolithic lock nut unit. Furthermore, separate nut segments permit the relative radial movement of the nut segments to provide the locking and releasing features.

Again referring in particular to FIGS. 3 and 4, rod assembly 26 comprises elongated threaded recliner rod 100 which preferably has a relatively high helix angle thread to allow split nut assembly 90 to rotate thereon when recliner rod 100 is pushed or pulled in a rectilinear manner. The helix angle is provided to transfer linear motion of recliner rod 100 into rotational motion of split nut assembly 90 and secondly, to reduce the "squeeze" force required to keep recliner mechanism 12 in a locked state. Threaded rod 100 is installed through a first rod bushing 102 having a generally longitudinal central passage 103 through which rod 100 extends. Thrust washers 104 are provided intermediate a planar transverse surface 106 of rod bushing 102 and a complementary surface provided on an end of clamp assembly 60. Split nut assembly 90 is disposed within the longitudinal passage 91 defined by inner wall surface 66 such that its opposite ends engage a facing surface on thrust washers 104. Thrust washers 104 are provided to reduce the friction generated between nut assembly 90 and rod bushing 102. Recliner rod 100 is threaded onto threads 93 of split nut assembly 90 such that its first end 28 extends therethrough and is disposed through a second set of thrust washers 104 and a second rod bushing 102. The second end 29 of recliner rod 100 is coupled to a rod end member 105 adapted to accept fastener 30 for attaching rod 100 to lower recliner structure 18. An elongated spring 107 is disposed over rod 100 having one end engage housing assembly 24 and its opposite end engage rod end 105. Spring 107 is adapted to biasingly urge seat back 16 to an "upright" position. A roll pin 110 extends through a transverse bore at first end 28 of recliner rod 100 and is adapted to be slidably disposed in an axially extending slot 112 provided in rod bushings 102. Rod bushings 102 have a lower portion defining a longitudinally extending passage 114 through which dowel pin 69 of clamp assembly 60 is disposed.

Housing members 50 and 50' are configured to define a recessed inner portion generally defining a first cavity 120 and a second cavity 122. Preferably, rod assembly 26 is nested within the recessed cavities 120 and 122 such that clamp assembly 60 is disposed within first cavity 120 and recliner rod 100 is generally disposed within second cavity 122. A slotted hole 124 extends through a portion of housing members 50 and 50' which corresponds in location to slot 112 of rod bushing 102. Roll pin 110, extending through rod 100, is disposed within slotted hole 124 of housing assembly 24 for defining a predetermined limited range of axial movement of rod 100. This limited axial movement produces a corresponding predetermined range of angular movement of seat back 16 relative to seat cushion 14.

Rotation of release shaft 74 generates threading action of threaded portion 80 into the threaded aperture on first locking clamp 62. Rotational movement of release shaft 74 is generated by release lever 40. Preferably, release shaft 74 extends through enlarged aperture 132 provided in housing members 50 and 50'. A plastic cap 134 protectively encloses the terminal end of threaded portion 80 of release shaft 74. Likewise, a pin-like member 136 extending transversely from shoulder 76 extends through aperture 132 provided on housing member 50'. Pin-like member 136 is secured to a portion of release lever 40 such that pivotal movement of release lever 40 generates corresponding pivotal movement of release shaft 74. Release lever 40 is biased to a first position by the biasing force of release spring 42. Preferably, the first position corresponds to a "locked" position of split nut assembly 90 relative to rod 100. The biasing force of release spring 42 and the rotated position of release lever 40 and shaft 74 produce a predetermined amount of pressure across the upper portions of locking clamps 62 and 64 such that they are forced to pivot around the fulcrum point. In this manner, a "squeezing" action is produced across split nut segments 92A through 92D. The surface force applied to the exterior surface of split nut assembly 90 by the "squeezed" locking clamps 62 and 64 collapses the split nut segments into the threads of rod 100 to generate a frictional lock therebetween to define the "locked" position.

Figure 7:
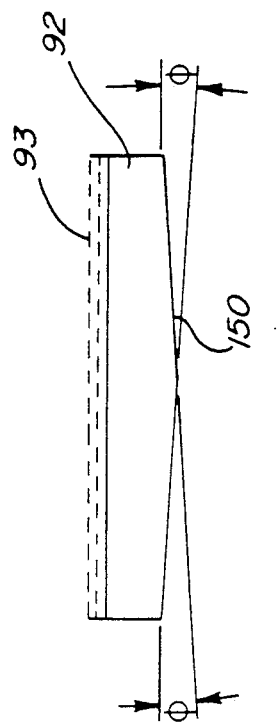
FIG. 7 is a side view of the split nut segment illustrated in FIG. 6.

Another primary principle of the present invention is its self-energizing characteristic which is employed to inhibit unrestrained motion of upper recliner structure 22 in the event of vehicle collision or improper operation. In reference to FIG. 7, split nut segments 92 are illustrated as having an external surface 150 which defines a predetermined ramp angle (θ) such that split nut assembly 90 defines oppositely extending frusto-conical tapered surfaces. External surface 150 is configured to mate with the frusto-conical tapered surface of passage 91.

According to the present invention, a dynamic locking action is generated in recliner 12 under extreme loading conditions. This locking action is produced by a "self-energizing" characteristic derived from the relationships between threaded recliner rod 100 and nut segments 92A-92D, and the mating frustoconical tapered wall surfaces of split nut assembly 90 and clamp assembly 60. When recliner rod 100 is forced in either direction, two distinct forces act on nut segments 92A-92D. The first force acts to expand the nut segments radially outward. This first "outward" force is generated by the pressure angle of the threaded surfaces. The outward force is restricted by the inner wall surface 91 associated with clamps 62 and 64. The area of surface 91 is relatively fixed when recliner 12 is in the locked state. Therefore, the outward force augments the clamping force to increase the frictional force acting to keep the nut segments from rotating.

The second force is an axially directed force which acts on the nut segments in the same direction as the applied force. The second force tends to drive the outer surface 150 of nut segments 92A-92D into engagement with inner surface 91 of clamp assembly 60. Since the surfaces are conical in nature, a "wedging" action is created. The ramp angle (0) is designed so that during this wedging action an inward force is generated which tends to force the threaded surface 93 of nut segments 92A-92D and the threads of recliner rod 100 together. Therefore, a further restriction of the rotation of nut segments 92A and 92D is generated. As such, the angularity of the ramped surfaces (0) can be designed to assist in maintaining recliner rod 100 in the "locked" position.

In operation, release spring 42 biases release lever and, consequently, release shaft in a direction to "squeeze" nut assembly 90 on recliner rod 100 to maintain recliner mechanism 12 in the "locked" state. The seat occupant can adjust the inclination of seat back 16 by remotely actuating release cable 34 to move inner cable 38 and, consequently, release lever 40 in a direction opposing the biasing force of release spring 42. Release shaft 74 is thereby rotated such that locking clamps 62 and 64 are permitted to pivot outwardly about the fulcrum point whereby elongated passage 130 is enlarged. A force exerted on seat back 16 (such as the weight of the seat occupant) acts on threaded rod 100 such that split segments 92A through 92D "expand" in retainers 94 to a point whereby split nut assembly 90 spins freely on recliner rod 100. In this manner, recliner rod 100 is permitted to move linearly and non-rotationally thereby pivotally moving seat back 16 relative to seat cushion 14. Likewise, second spring 107 biases rod 100 to move seat back 16 to the upright position when recliner mechanism 12 is in its released state. Upon release of the remote actuation device, release spring 42 again biases the components to a locked state, thereby locking the seat back 16 in the desired position. It will be appreciated by those skilled in the art that remote actuation of release shaft 74 may be accomplished by any manual or automatic remote actuation means known in the art.

Figure 9:
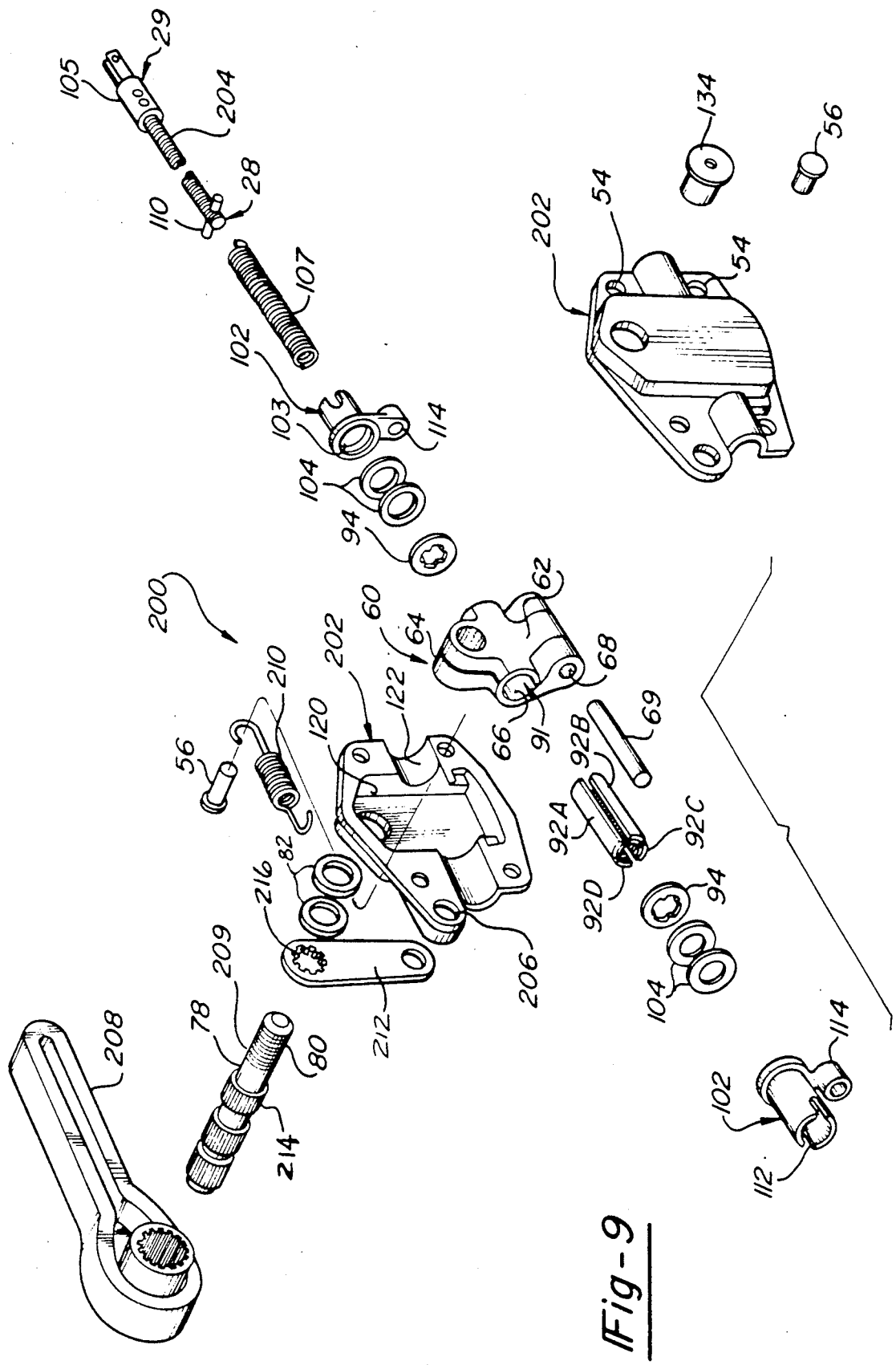
FIG. 9 is an exploded perspective view of the recliner mechanism shown in FIG. 8.

Referring now to FIGS. 8 and 9, a second preferred embodiment of the present invention is illustrated. Like numbers are used to designate like components herebefore described. In general, FIGS. 8 and 9 illustrate a seat assembly 10 preferably adapted for installation in a motor vehicle. The second embodiment is substantially identical in function and operation to that previously described in view of the first embodiment except that a greater range of angular reclining motion of seat back 16 is provided and the apparatus shown is a passenger seat reclining device.

Recliner mechanism 200 includes a housing assembly 202. Threaded rod assembly 26 is substantially identical to that illustrated in FIGS. 1 through 4 with the exception that threaded recliner rod 204 is longer to provide the increased range of reclining motion. Rod 204 extends through opposite longitudinal ends of housing assembly 202 through second cavity 122 such that rod end member 105 is adapted to attach second end 29 of rod assembly 26 to lower recliner structure 18. Bore 206 in housing assembly 202 is adapted to mount recliner 200 to structure associated with seat assembly 10.

Release means, associated with recliner 200, for permitting recliner rod 204 to move linearly and non-rotationally to adjust the angular position of seat back 16 includes a manual actuator handle or arm 208 splined to release shaft 209 for movement therewith. Release spring 210 is adapted to maintain release lever 212 and, in turn, release shaft 209 in a first biased position defining the "locked" condition. In particular, release shaft 209 has a splined portion 214 which is affixed within aperture 216 of release lever 212 for permitting concurrent movement thereof. While this embodiment illustrates a manual actuator arm 208, it is to be understood that any means for rotating release shaft 209 from a first "locked" position to a second "released" position is within the fair scope of this invention.

FIG. 9 illustrates the commonality of components between the embodiments described. As is apparent, the second embodiment utilizes many components identical to those applicable for the first preferred embodiment.

Those skilled in the art can appreciate that other features and advantages can be obtained from the use of this invention and that modifications can be made without departing from the true spirit of the invention after studying the specification, drawings, and the following claims.

What is claimed is:

1. A seat recliner mechanism for controllably adjusting the angular position of a seat back relative to a seat member, said mechanism being responsive to actuation by a seat occupant, comprising:
   a threaded rod adapted to be operatively connected to one of said seat back and said seat member;
   said recliner mechanism adapted to be pivotally connected to the other of said seat back and said seat member and configured to receive a portion of said rod for linear non-rotational movement relative thereto;
   a plurality of threaded nut segments concentrically surrounding and threadably engaging said threaded rod, said threaded nut segments adapted for radial movement with respect to said threaded rod between a first radially inward position wherein said threaded nut segments are restrained from rotation on said threaded rod for inhibiting linear movement of said threaded rod, and a second radially outward position wherein said nut segments rotate on said threaded rod for permitting linear movement thereof;
   retainer means for orientating and retaining said plurality of nut segments in threaded engagement with said threaded rod, said retainer means configured to define a range of radial movement of said nut segments relative to said threaded rod between said first and second radial positions, said nut segments and said retainer means defining a split nut assembly;

actuation means associated with said nut segments for producing movement thereof from said first radial position wherein the angular positioning between said seat back and seat member is established to said second radial position wherein said threaded rod is movable relative to said recliner mechanism such that the relative angular positioning between said seat back and said seat member is adjustable; and first biasing means associated with said actuation means for urging said nut segments to said first radial position.

2. The seat recliner mechanism of claim 1 further comprising second biasing means associated with said threaded rod for urging said seat back to an upright position when said nut segments are in said second radial position.

3. The seat recliner mechanism of claim 2 wherein said threaded rod is operatively connected to said seat back and said recliner mechanism is operatively connected to said seat member.

4. The seat recliner mechanism of claim 2 wherein said split nut assembly includes four equally sized threaded nut segments and wherein said retainer means comprises at least one disc-like plate having a central aperture configured to maintain said four nut segments in proper angular orientation relative to each other and to said threaded rod during radial movement between said first and second positions, said at least one disc-like plate disposed adjacent a longitudinal end of said threaded nut segments.

5. The seat recliner mechanism of claim 2 wherein said actuation means includes first and second lock clamp members having mating inner wall surfaces defining a generally cylindrical elongated passage adapted to receive said threaded nut segments therein, said first and second lock clamp members fixed about a first pivot such that rotation in a first direction reduces the cross-section of said elongated passage for causing inward radial movement of said nut segments toward said first position, and rotation in a second direction enlarges the cross-section of said passage for permitting outward radial movement of said nut segments toward said second position.

6. The seat recliner mechanism of claim 5 wherein said actuation means further includes release means for selectively pivoting at least one of said first and second lock clamp members in said first and second directions to vary the size of said elongated passage such that when said at least one of said first and second lock clamp members is pivoted in said first direction said inner wall surface act on said nut segments to urge said threads of said nut segments into locking contact with said threaded rod to restrain linear non-rotational movement thereof, and when said at least one of said first and second lock clamp members is pivoted in said second direction movement of said threaded rod urges said nut segments to move radially outwardly to said second position such that said split nut assembly rotates on said threaded rod for permitting linear non-rotational movement of said rod.

7. The seat recliner mechanism of claim 6 wherein said first biasing means acts on said release means for biasing said release means in said first direction to maintain said nut segments in locking engagement with said threaded rod.

8. The seat recliner mechanism of claim 7 wherein said release means includes manually operable means for permitting a seat occupant to pivot said at least one of said first and second lock clamp members in said second direction.

9. The seat recliner mechanism of claim 8 wherein said first and second lock clamp members are supported within a housing, said housing including means for limiting the range of axial movement of said threaded rod relative to said lock clamp members to define a predetermined corresponding range of angular adjustment of said seat back relative to said seat member.

10. The seat recliner mechanism of claim 9 further comprising auxiliary locking means associated with said nut segments and said inner wall surface of said mating first and second lock clamp members for restraining angular movement of said seat back with respect to said seat member in the event of failure of said mechanism upon sudden impact.

11. A seat recliner mechanism for controllably adjusting the angular position of a seat back relative to a seat member, said mechanism being responsive to actuation by a seat occupant, comprising:

a threaded rod having a first end adapted to be operatively connected to said seat back;

a housing adapted to be operatively connected to said seat member and receiving said second end of said threaded rod for linear non-rotational movement relative thereto;

a clamp assembly mounted within said housing and having an inner wall surface defining an elongated passage, said clamp assembly having at least one pivotal lock clamp member adapted to reduce the cross-section of said passage when pivoted in a first direction and to enlarge the cross-section of said passage when pivoted in a second direction;

a plurality of nut segments each having an outer surface engageable with said inner wall surface of said clamp assembly and a threaded inner bore in threaded engagement with said threaded rod, and retaining means for orienting and retaining said nut segments in threaded engagement with said threaded rod such that said nut segments are rotatable on said threaded rod, said retaining means defining a range of radial movement of said nut segments relative to said threaded rod;

actuation means operatively coupled to said clamp assembly for pivoting said at least one clamp lock member such that when said lock clamp member is pivoted in said first direction and inner wall surface of said clamp assembly urges said nut segments to move to a radially inward position so as to lockingly engage said threaded rod whereby said nut segments are inhibited from rotating on said threaded rod to define a fixed angular position of said seat back relative to said seat, and when said lock clamp member is pivoted in said second direction said enlarged passage permits said nut segments to move to a radially outward position upon movement of said threaded rod whereby said nut segments are permitted to rotate on said threaded rod such that the angular position of said seat back is adjustable;

first spring means acting on said threaded rod to urge said seat back to an upright position when said clamp assembly is pivoted in said second direction; and second spring means associated with said actuation means for urging said at least one lock clamp member in said first direction.

12. The seat recliner mechanism of claim 11 further comprising linear motion limiting means for limiting the range of axial movement of said threaded rod relative to said clamp assembly so as to define a corresponding range of angular movement of said seat back relative to said seat member.

13. The seat recliner mechanism of claim 11 wherein said actuation means includes a release shaft threadably engaging a threaded aperture in said clamp assembly such that rotation of said release shaft in one direction pivots said at least one lock clamp member in said first direction and rotation of said release shaft in an opposite direction pivots said at least one lock clamp member in said second direction.

14. The seat recliner mechanism of claim 13 wherein said second spring means biases said release shaft to urge said at least one lock clamp member in said first direction to maintain said seat back in a locked condition.

15. The seat recliner mechanism of claim 14 wherein said release shaft is coupled to a release lever adapted to be coupled to release means for permitting a seat occupant to selectively release said seat back, said release lever biased to a locked position by said second spring means.

16. The seat recliner mechanism of claim 15 wherein said release means is a release cable having an axially movable inner core coupled to said release lever such that remote axial movement of said inner core acts to pivot said release lever in opposition to said second spring means to pivot said at least one lock clamp member in said second direction thereby permitting said nut segments to rotate on said threaded rod.

17. The seat recliner mechanism of claim 15 wherein said release means is a manually operated handle coupled to said release shaft for manual rotation thereof.

18. A seat assembly comprising:
a seat member;
a seat back coupled to said seat member;
pivot means for permitting pivotal movement of said seat back relative to said seat member;
an elongated threaded rod adapted to be operatively connected to one of said seat back and said seat member;
said recliner mechanism adapted to be pivotally connected to the other of said seat back and said seat member and configured to receive a portion of said rod for linear non-rotational movement relative thereto;
a plurality of threaded nut segments concentrically surrounding and threadably engaging said threaded rod, said threaded nut segments adapted for radial movement with respect to said threaded rod between a first radially inward position wherein said threaded nut segments are restrained from rotation on said threaded rod for inhibiting linear movement of said threaded rod, and a second radially outward position wherein said nut segments rotate on said threaded rod for permitting linear movement thereof;
retainer means for orientating and retaining said plurality of nut segments in threaded engagement with said threaded rod, said retainer means configured to define a range of radial movement of said nut segments relative to said threaded rod between said first radial position and said second radial position, said nut segments and said retainer means defining a split nut assembly;

actuation means associated with said nut segments for producing movement thereof between said first radial position wherein the angular positioning between said seat back and seat member is established, and said second radial position wherein said elongated threaded rod is movable relative to said recliner mechanism such that the relative angular positioning between said seat back and said seat member is adjustable; and first biasing means associated with said actuation means for urging said nut segments to said first radial position.

19. The seat assembly of claim 18 further comprising second biasing means associated with said threaded rod for urging said seat back to an upright position when said nut segments are in said second position.

20. The seat assembly of claim 19 wherein said threaded rod is operatively connected to said seat back and said recliner mechanism is operatively connected to said seat member.

21. The seat assembly of claim 19 wherein said plurality of nut segments includes four equally sized nut segments and wherein said retainer means comprises at least one disc-like plate having a central aperture configured to maintain said four nut segments in proper orientation relative to each other and to said threaded rod during radial movement of said nut segments between said first and second positions, said disc-like plate disposed adjacent a longitudinal end of said nut segments to define a split nut assembly.

22. The seat assembly of claim 19 wherein said actuation means includes first and second lock clamps having mating inner wall surfaces defining a generally cylindrical passage adapted to receive said threaded nut segments therein, said first and second lock clamps fixed about a first pivot such that rotation in a first direction reduces the cross-section of said passage for causing inward radial movement of said nut segments to said first position, and rotation in a second direction enlarges the cross-section of said passage for permitting outward radial movement of said nut segments to said second position.

23. The seat assembly of claim 22 wherein said actuation means further includes release means for selectively pivoting at least one of said first and second lock clamps in said first and second directions to vary the size of said elongated passage such that when said at least one of said first and second lock clamps are pivoted in said first direction said inner wall surfaces act on said nut segments to urge said threads of said nut segments into locking contact with said threaded rod to restrain linear non-rotational movement thereof, and when said at least one of said first and second lock clamps are pivoted in said second direction movement of said threaded rod urges said nut segments to move radially outwardly to said second position such that said split nut assembly rotates on said threaded rod for permitting linear non-rotational movement of said rod.

24. A method for providing infinite adjustment of a seat back relative to as eat member through a predetermined angular range, said method comprising the steps of:

providing a seat recliner mechanism having a linearly movable, non-rotatable threaded rod and a rotatable split nut assembly including a plurality of threaded nut segments concentrically surrounding and threadably engaging said threaded rod, said threaded nut segments movable with respect to said threaded rod between a first radially inward position and a second radially outward position;

connecting an end of said threaded rod to one of said seat member or said seat back;

connecting said seat recliner mechanism to the other of said seat member or said seat back;

urging said nut segments to said first radially inward position such that said nut segments lockingly engage said threaded rod for restraining said nut segments from rotating on said threaded rod whereby the inclination of said seat back relative to said seat member is lockingly established;

selectively moving said nut segments to said second radially outward position for releasing said nut segments from locking engagement with said threaded rod for allowing said nut segments to rotate on said threaded rod whereby said threaded rod is linearly movable for adjusting the inclination of said seat back; and biasing said seat back to an upright position when said nut segments are released.

* * * * *